US012347358B2

(12) United States Patent
Lin et al.

(10) Patent No.: US 12,347,358 B2
(45) Date of Patent: Jul. 1, 2025

(54) DISPLAY MODULE AND TERMINAL APPARATUS

(71) Applicant: SHENZHEN CHINA STAR OPTOELECTRONICS SEMICONDUCTOR DISPLAY TECHNOLOGY CO., LTD., Guangdong (CN)

(72) Inventors: Shichao Lin, Guangdong (CN); Meng Hu, Guangdong (CN); Danchun Lian, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/400,469

(22) Filed: Dec. 29, 2023

(65) Prior Publication Data

US 2025/0182665 A1 Jun. 5, 2025

(30) Foreign Application Priority Data

Nov. 30, 2023 (CN) ......................... 202311637466.8

(51) Int. Cl.
*G09G 3/20* (2006.01)

(52) U.S. Cl.
CPC ... *G09G 3/2011* (2013.01); *G09G 2310/0291* (2013.01); *G09G 2320/0209* (2013.01); *G09G 2320/0673* (2013.01); *G09G 2320/08* (2013.01)

(58) Field of Classification Search
CPC ......... G09G 3/2011; G09G 2320/0673; G09G 2320/0209; G09G 2310/0291; G09G 2320/08
See application file for complete search history.

(56) References Cited

U.S. PATENT DOCUMENTS

2012/0146720 A1* 6/2012 Hsu ..................... H03F 3/45632 330/69
2015/0015560 A1* 1/2015 Zhu ...................... G09G 3/3614 345/212
2021/0233477 A1* 7/2021 Li ........................ G09G 3/3283
2023/0215384 A1* 7/2023 Kim ..................... G09G 3/2007 345/690

* cited by examiner

*Primary Examiner* — Muhammad N Edun
(74) *Attorney, Agent, or Firm* — HSML P. C.

(57) ABSTRACT

An embodiment of the present application discloses a display module and terminal apparatus. The display module includes a plurality of data driver integrated circuits. Each data driver integrated circuit includes a buffer amplifier, a gamma voltage terminal, a data voltage terminal, and a simulation voltage terminal. The buffer amplifier includes an input terminal electrically connected to the gamma voltage terminal, an output terminal electrically connected to the data voltage terminal, and an auxiliary signal input terminal electrically connected to the simulation voltage terminal. The simulation voltage terminal is electrically connected to the gamma voltage terminal via a capacitor. When switching between grayscales, a fluctuation of the simulation voltage terminal is coupled to a signal of the gamma voltage terminal by capacitive coupling, the signal of the gamma voltage terminal includes a fluctuation with the same phase as in the common voltage terminal.

18 Claims, 5 Drawing Sheets

DISPLAY MODULE AND TERMINAL APPARATUS

CROSS REFERENCE TO RELATED APPLICATIONS

This application claims the priority to Chinese Patent Application No. 202311637466.8, filed on Nov. 30, 2023. The entire disclosures of the above application are incorporated herein by reference.

FIELD OF INVENTION

The present application relates to a field of display technologies, especially to a display module, terminal apparatus.

BACKGROUND OF INVENTION

In a display panel structure, a coupling capacitor exists between a data line and a common electrode. Due to the influence of the coupling capacitor, when there is an instantaneous change in the data line voltage, the common voltage also undergoes a change due to coupling. Moreover, the coupling of the positive polarity data voltage signal and the negative polarity data voltage signal to the common voltage cannot be canceled out, resulting in the phenomenon of horizontal crosstalk.

Therefore, conventional display modules face technical issues related to horizontal crosstalk.

SUMMARY OF INVENTION

An embodiment of the present application provides a display module, terminal apparatus that can ease a technical issue of horizontal crosstalk existing in a conventional display module.

The embodiment of the present application provides a display module, comprising a plurality of data driver integrated circuits configured to provide data lines with data voltage signals, wherein each of the data driver integrated circuits comprises:

- a buffer amplifier comprising an input terminal, an output terminal, and an auxiliary signal input terminal;
- a gamma voltage terminal electrically connected to the input terminal;
- a data voltage terminal electrically connected to the output terminal; and
- a simulation voltage terminal electrically connected to the auxiliary signal input terminal;
- wherein the simulation voltage terminal is electrically connected to the gamma voltage terminal via a capacitor.

Optionally, in some embodiments of the present application, the data driver integrated circuit comprises a positive polarity data driver integrated circuit and a negative polarity data driver integrated circuit, wherein the positive polarity data driver integrated circuit comprises a first buffer amplifier, a positive polarity gamma voltage terminal, a positive polarity data voltage terminal, a simulation voltage terminal; the negative polarity data driver integrated circuit comprises a second buffer amplifier, a negative polarity gamma voltage terminal, a negative polarity data voltage terminal, and a simulation voltage terminal, the simulation voltage terminal is electrically connected to the positive polarity gamma voltage terminal via a first type capacitor, and the simulation voltage terminal is electrically connected to the negative polarity gamma voltage terminal via a second type capacitor.

Optionally, in some embodiments of the present application, the display module further comprises a common voltage signal, when switching between different grayscales, a signal of the simulation voltage terminal comprises a first waveform, the common voltage signal is coupled to a signal outputted by the positive polarity data voltage terminal and a signal outputted by the negative polarity data voltage terminal to have a second waveform, and the first waveform and the second waveform comprise a same phase.

Optionally, in some embodiments of the present application, the display module further comprises a common voltage signal, when switching between different grayscales, the common voltage signal generates a waveform, a voltage difference of a signal of the positive polarity data voltage terminal relative to the common voltage signal is constant, and a voltage difference of a signal of the negative polarity data voltage terminal relative to the common voltage signal is constant.

Optionally, in some embodiments of the present application, the first waveform by coupling of the first type capacitor makes a signal of the positive polarity gamma voltage terminal generate a third waveform, the first waveform makes a signal of the negative polarity gamma voltage terminal generate a fourth waveform by coupling of the second type capacitor, and a phase of each of the third waveform and the fourth waveform is the same as the phase of the first waveform.

Optionally, in some embodiments of the present application, a capacitor value of the first type capacitor is positively correlated with a fluctuation of the third waveform during grayscale switching, and a capacitor value of the second type capacitor is positively correlated with a fluctuation of the fourth waveform during grayscale switching.

Optionally, in some embodiments of the present application, a signal of the positive polarity gamma voltage terminal comprises one of Vr1, . . . , and Vr7, and a signal of the negative polarity gamma voltage terminal comprises one of Vr8, . . . , and Vr14.

Optionally, in some embodiments of the present application, the first buffer amplifier is electrically connected to the second buffer amplifier, polarities of adjacent ones of the data driver integrated circuits are opposite to each other, and the polarities of adjacent ones of the data driver integrated circuits are changed periodically.

Optionally, in some embodiments of the present application, one of the first buffer amplifiers and one of the second buffer amplifiers constitute a driver unit, the driver units are electrically connected to constitute a buffer module, an end of the buffer module is electrically connected to the simulation voltage terminal, and another end of the buffer module is grounded.

The embodiment of the present application provides a terminal apparatus comprising a display module comprising a plurality of data driver integrated circuits configured to provide data lines with data voltage signals, wherein each of the data driver integrated circuits comprises:

- a buffer amplifier comprising an input terminal, an output terminal, and an auxiliary signal input terminal;
- a gamma voltage terminal electrically connected to the input terminal;
- a data voltage terminal electrically connected to the output terminal; and
- a simulation voltage terminal electrically connected to the auxiliary signal input terminal;

wherein the simulation voltage terminal is electrically connected to the gamma voltage terminal via a capacitor.

A display module, comprising a plurality of data driver integrated circuits configured to provide data lines with data voltage signals, wherein each of the data driver integrated circuits comprises:

a buffer amplifier comprising an input terminal, an output terminal, and an auxiliary signal input terminal;

a gamma voltage terminal electrically connected to the input terminal;

a data voltage terminal electrically connected to the output terminal; and a simulation voltage terminal electrically connected to the auxiliary signal input terminal;

wherein the simulation voltage terminal is electrically connected to the gamma voltage terminal via a capacitor;

wherein the data driver integrated circuit comprises a positive polarity data driver integrated circuit and a negative polarity data driver integrated circuit, wherein the positive polarity data driver integrated circuit comprises a first buffer amplifier, a positive polarity gamma voltage terminal, a positive polarity data voltage terminal, a simulation voltage terminal; the negative polarity data driver integrated circuit comprises a second buffer amplifier, a negative polarity gamma voltage terminal, a negative polarity data voltage terminal, and a simulation voltage terminal, the simulation voltage terminal is electrically connected to the positive polarity gamma voltage terminal via a first type capacitor, and the simulation voltage terminal is electrically connected to the negative polarity gamma voltage terminal via a second type capacitor;

wherein the first buffer amplifier is electrically connected to the second buffer amplifier, polarities of adjacent ones of the data driver integrated circuits are opposite to each other, and the polarities of adjacent ones of the data driver integrated circuits are changed periodically;

wherein one of the first buffer amplifiers and one of the second buffer amplifiers constitute a driver unit, the driver units are electrically connected to constitute a buffer module, an end of the buffer module is electrically connected to the simulation voltage terminal, and another end of the buffer module is grounded.

Optionally, the display module further comprises a common voltage signal, when switching between different grayscales, a signal of the simulation voltage terminal comprises a first waveform, the common voltage signal is coupled to a signal outputted by the positive polarity data voltage terminal and a signal outputted by the negative polarity data voltage terminal to have a second waveform, and the first waveform and the second waveform comprise a same phase.

Optionally, the display module further comprises a common voltage signal, when switching between different grayscales, the common voltage signal generates a waveform, a voltage difference of a signal of the positive polarity data voltage terminal relative to the common voltage signal is constant, and a voltage difference of a signal of the negative polarity data voltage terminal relative to the common voltage signal is constant.

Optionally, the first waveform by coupling of the first type capacitor makes a signal of the positive polarity gamma voltage terminal generate a third waveform, the first waveform makes a signal of the negative polarity gamma voltage terminal generate a fourth waveform by coupling of the second type capacitor, and a phase of each of the third waveform and the fourth waveform is the same as the phase of the first waveform.

Optionally, a capacitor value of the first type capacitor is positively correlated with a fluctuation of the third waveform during grayscale switching, and a capacitor value of the second type capacitor is positively correlated with a fluctuation of the fourth waveform during grayscale switching.

Optionally, a signal of the positive polarity gamma voltage terminal comprises one of Vr1, . . . , and Vr7, and a signal of the negative polarity gamma voltage terminal comprises one of Vr8, . . . , and Vr14.

Advantages: by electrically connecting the simulation voltage terminal to the gamma voltage terminal via a capacitor, during grayscale switching, a first waveform of a signal of the simulation voltage terminal, by capacitive coupling, would be coupled to a signal of the gamma voltage terminal. The signal of the gamma voltage terminal comprises a waveform including a phase the same as that of the common voltage terminal such that a voltage difference of each of the positive polarity data voltage signal and the negative polarity data voltage signal relative to a common voltage signal tends to be constant during grayscale switching, which mitigates the technical issue of horizontal crosstalk existing in the conventional display module.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may also acquire other figures according to the appended figures without any creative effort.

Figure 1:
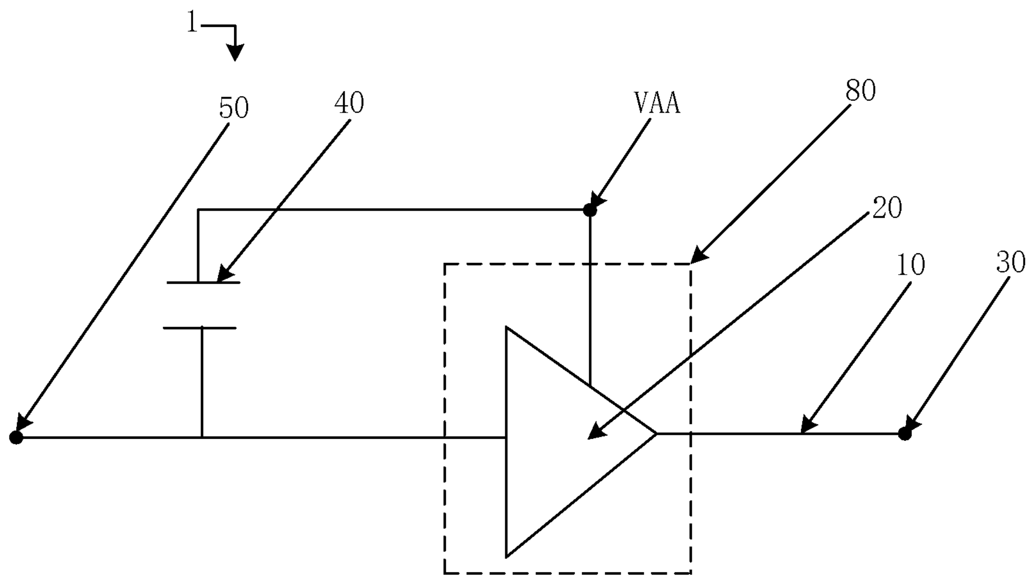
FIG. 1 is a schematic view of a data driver integrated circuit of a display module provided by the present application.

Reference character indication:

| Reference character | Element name | Reference character | Element name |
|---|---|---|---|
| 1 | data driver integrated circuits | 2 | positive polarity data driver integrated circuit |
| 3 | negative polarity data driver integrated circuit | 10 | data line |
| 101 | positive polarity data line | 102 | negative polarity data line |

-continued

| Reference character indication: | | | |
|---|---|---|---|
| Reference character | Element name | Reference character | Element name |
| 20 | buffer amplifier | 201 | first buffer amplifier |
| 202 | second buffer amplifier | 30 | data voltage terminal |
| 301 | positive polarity data voltage terminal | 302 | negative polarity data voltage terminal |
| 40 | capacitor | 401 | first type capacitor |
| 402 | second type capacitor | 50 | gamma voltage terminal |
| 501 | positive polarity gamma voltage terminal | 502 | negative polarity gamma voltage terminal |
| 60 | driver unit | VAA | simulation voltage terminal |
| Vcom | common voltage | 70 | DAC module |
| 80 | buffer module | 4 | data driver chip |
| 90 | digital signal | | |

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application. In addition, it should be understood that the specific embodiments described here are only used to illustrate and explain the present application, and are not used to limit the present application. In the present application, the used orientation terminologies such as “upper” and “lower”, when not specified to the contrary explanation, usually refer to the upper and lower states of the device in actual use or working conditions, specifically according to the direction of the figures in the drawings. Furthermore, “inner” and “outer” refer to the outline of the device.

With reference to FIG. 1, a display module provided by the present application comprises a plurality of data driver integrated circuits 1, one of the data driver integrated circuits 1 is configured to provide a data line 10 with a data voltage signal. The data driver integrated circuit 1 comprises a buffer amplifier 20, a gamma voltage terminal 50, a data voltage terminal 30, and a simulation voltage terminal VAA. The buffer amplifier 20 comprises an input terminal, an output terminal, and an auxiliary signal input terminal. The gamma voltage terminal 50 is electrically connected to the input terminal. The data voltage terminal 30 is electrically connected to the output terminal. The simulation voltage terminal VAA is electrically connected to the auxiliary signal input terminal. The simulation voltage terminal VAA is electrically connected to the gamma voltage terminal 50 via a capacitor 40.

It can be understood that adjusting the value of the capacitor can also adjust an amplitude of a waveform of a signal of the gamma voltage terminal.

It can be understood that the buffer amplifier 20 receives a signal of the gamma voltage terminal 50 and outputs the data voltage signal. A signal of the simulation voltage terminal VAA is influenced by a common voltage signal Vcom to generate a waveform the same as that of the common voltage signal Vcom. The capacitor 40 is used to connect the simulation voltage terminal VAA to the gamma voltage terminal 50 such that a waveform of a signal of the simulation voltage terminal VAA is coupled to a signal of the gamma voltage terminal 50. The signal of the gamma voltage terminal 50 comprises a waveform including a phase the same as that of the common voltage signal. Then, the signal of the gamma voltage terminal 50, by processing of a DAC module 70, is inputted in the buffer amplifier 20 to influence an output signal of the data voltage terminal 30 such that a voltage difference of a positive polarity data voltage signal or a negative polarity data voltage signal relative to the common voltage signal tends to be constant during grayscale switching.

Furthermore, also, the voltage difference of each of the positive polarity data voltage signal and the negative polarity data voltage signal during grayscale switching relative to the common voltage signal can be kept constant.

It can be understood that during grayscale switching, the voltage difference of each of the positive polarity data voltage signal and the negative polarity data voltage signal relative to the common voltage signal comprises a fluctuation such that the common voltage signal is influenced by the data voltage signal step change to generate a waveform. The waveform during grayscale switching comprises a fluctuation, and the data voltage signal comprises an instantaneous step change. No such fluctuation exists during grayscale switching, resulting in that a voltage difference between each of the positive polarity data voltage signal and the negative polarity data voltage signal and the common voltage signal changes during grayscale switching relative to no grayscale switching. Also, such voltage difference change results in a phenomenon of the display panel having horizontal crosstalk. The present application decreases such voltage difference change or remove such voltage difference change to ease the issue of the horizontal crosstalk.

The above common voltage signal influenced by the data voltage signal step change means that: The waveform of the common electrode voltage is generated due to existence of a parasitic capacitor of the display panel resulting in the common voltage signal influenced by the data voltage signal step change and coupled to the data signal to generate the waveform.

It can be understood that because the signal of the simulation voltage terminal is required to supply energy for a driving signal instantaneous step change of the data voltage terminal, the waveform of the signal of the simulation voltage terminal would have a fluctuation.

It should be noticed that relative to conventional technology adopts a method of adding an inverter in a compensation circuit to compensate the common voltage signal Vcom, the present application requires no an additional inverter, and only needs to employs the capacitor 40 to electrically connect the conventional simulation voltage terminal VAA to the conventional gamma voltage terminal 50, which is structurally simple and drastically the cost. Furthermore, the conventional technology adds an inverter circuit on an external of an integrated circuit to compensate a Vcom voltage and enhance a load capability of the Vcom voltage. The compensation comprises a delay and minor horizontal crosstalk. A voltage difference of the data voltage signal of each of the positive and negative polarities relative to the common voltage signal obtained by the present application during grayscale switching can tend to be constant, which eliminates horizontal crosstalk resulting from the waveform of the common voltage signal Vcom.

In the present embodiment, by electrically connecting the simulation voltage terminal VAA to the gamma voltage terminal 50 via the capacitor 40, during grayscale switching, the fluctuation of the waveform of the signal of the simulation voltage terminal VAA via the capacitor 40 coupling method, can be coupled to the signal of the gamma voltage terminal 50. The signal of the gamma voltage terminal 50 comprises a waveform including a phase the same as that of the common voltage signal such that the voltage difference of each of the positive polarity data voltage signal and the negative polarity data voltage signal relative to the common voltage signal tends to be constant during grayscale switching, which mitigates horizontal crosstalk.

The technical solution of the present application is described accompanying with specific embodiments.

The embodiment of the present application only uses a simulation voltage signal as an example for explanation, and it is also applied to other voltage signal comprising the same waveform as in the common voltage signal Vcom. A main conception of the present application is to couple the waveform of the simulation voltage signal to the waveform of the gamma voltage signal via the capacitor 40 such that the waveform of the gamma voltage signal can have the waveform of the common voltage signal Vcom. Also, the waveform of the gamma voltage signal obtained from coupling is inputted in the buffer amplifier 20, and is processed by the buffer amplifier 20 to obtain the positive polarity data voltage signal and the negative polarity data voltage signal. During grayscale switching, a voltage difference of each of the positive polarity data voltage signal and the negative polarity data voltage signal relative to the common voltage signal can tend to be constant.

Furthermore, a quantity of grayscales of the present application, connection relationships and electrical connection methods of the data driver integrated circuits 1 are only described in better or best embodiments. Other conditions that can meet the requirements of the process and modification reactions should also fall within the protective scope of the present invention, and will not be elaborated further here.

It should be noted that the present application, by adjusting the value of the capacitor, can adjust a fluctuation amplitude of the signal waveform of the gamma voltage terminal to make the fluctuation amplitude of the signal waveform of the gamma voltage terminal approximate to a fluctuation amplitude of the waveform of the common voltage signal such that a fluctuation amplitude of each of the positive polarity data driving signal and the negative polarity data driving signal approximates to the fluctuation amplitude of the common voltage signal, which decreases a variation amount of the voltage difference of each of the positive polarity data driving signal and the negative polarity data driving signal during grayscale switching relative to the common voltage signal to mitigate horizontal crosstalk.

Figure 2:
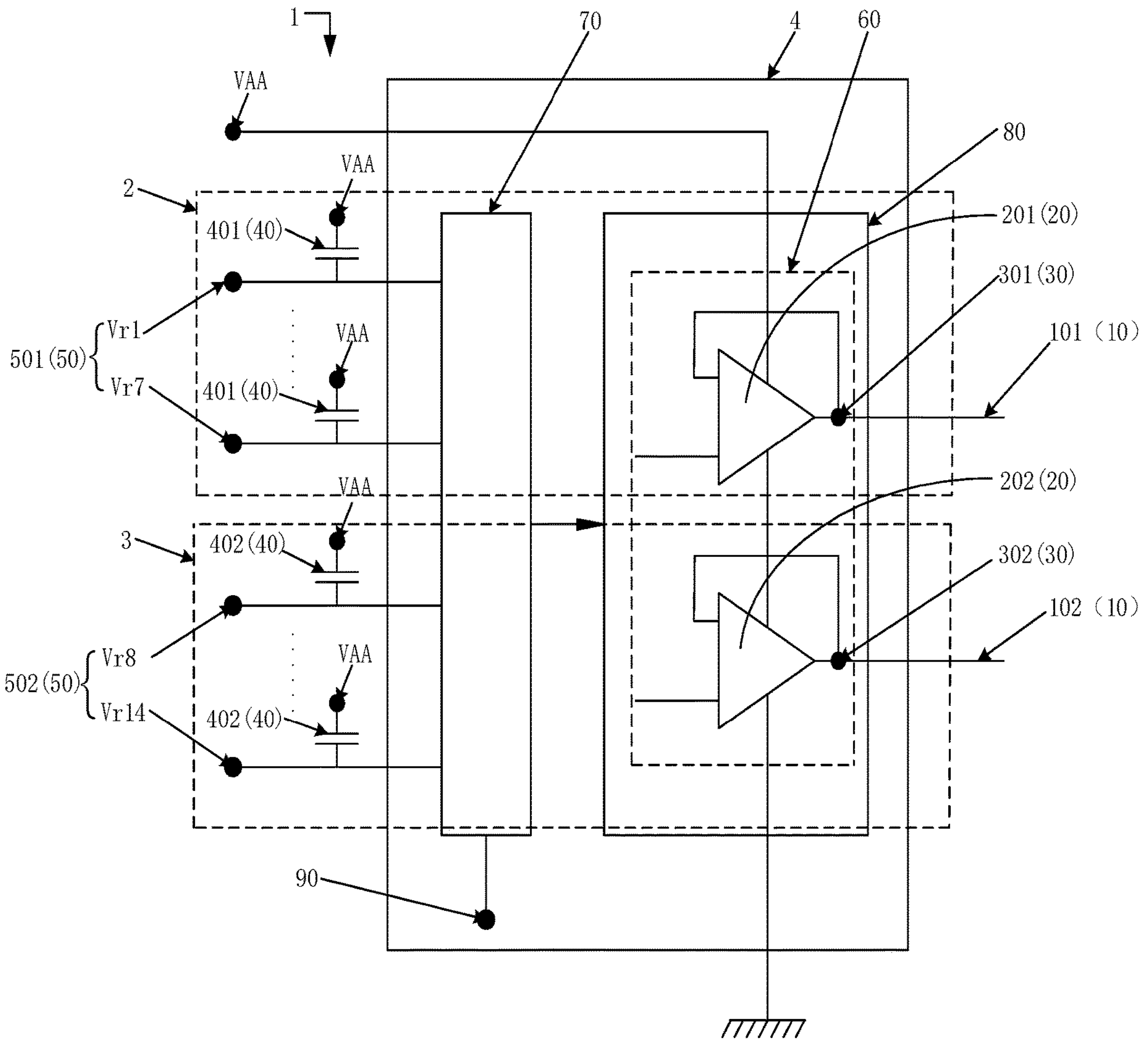
FIG. 2 is a schematic view of two adjacent data driver integrated circuits with opposite polarities of the display module provided by the present application.

In an embodiment, with reference to FIG. 2, the data driver integrated circuits 1 comprises a positive polarity data driver integrated circuit 2 and a negative polarity data driver integrated circuit 3. The positive polarity data driver integrated circuit 2 comprises a first buffer amplifier 201, a positive polarity gamma voltage terminal 501, a positive polarity data voltage terminal 301, and a simulation voltage terminal VAA. The negative polarity data driver integrated circuit 3 comprises a second buffer amplifier 202, a negative polarity gamma voltage terminal 502, a negative polarity data voltage terminal 302, and a simulation voltage terminal VAA. The simulation voltage terminal VAA is electrically connected to the positive polarity gamma voltage terminal 501 via a first type capacitor 401. The simulation voltage terminal VAA is electrically connected to the negative polarity gamma voltage terminal 502 via a second type capacitor 402.

The positive polarity data driver integrated circuit 2 is configured to supply a positive polarity data line 101 with a positive polarity data voltage signal. The negative polarity data driver integrated circuit 3 is configured to supply a negative polarity data line 102 with a negative polarity data voltage signal.

A value relationship between the first type capacitor 401 and the second type capacitor 402 can be adjusted according to actual demands. The first type capacitor 401 can be equal to the second type capacitor 402.

In an embodiment, the display module further comprises a common voltage signal, when switching between different grayscales, the common voltage signal generates a waveform, a voltage difference of a signal of the positive polarity data voltage terminal relative to the common voltage signal is constant, and a voltage difference of a signal of the negative polarity data voltage terminal relative to the common voltage signal is constant.

In an embodiment, the positive polarity data driver integrated circuit 2 and the negative polarity data driver integrated circuit 3 are disposed alternately.

In an embodiment, one first buffer amplifier 201 and one second buffer amplifier 202 constitute one driver unit 60. The driver units 60 are electrically connected to constitute a buffer module. An end of the buffer module is electrically connected to the simulation voltage terminal VAA, and another end of the buffer module is grounded.

In an embodiment, a first resistor is in series connection between the simulation voltage terminal VAA and the positive polarity gamma voltage terminal 501. A second resistor is in series connection between the simulation voltage terminal VAA and the negative polarity gamma voltage terminal 502.

In an embodiment, the voltage of the positive polarity gamma voltage terminal 501 comprises any one of Vr1, . . . , and Vr7. The voltage of the negative polarity gamma voltage terminal 502 comprises any one of Vr8, . . . , and Vr14.

The data driver chip 4 comprises a DAC module 70. Input terminals of the DAC module 70 are Vr1, . . . , and Vr7, Vr8, . . . , Vr1. Output terminals of the DAC module 70 correspond to input terminals of the buffer amplifier 20 respectively.

It can be understood that by processing of the DAC module 70, the Vr1 to Vr7 are configured to control 256 grayscales of the positive polarity data driver integrated circuit, the Vr8 to the Vr14 are configured to control 256 grayscales of the negative polarity data driver integrated circuit.

Figure 3:
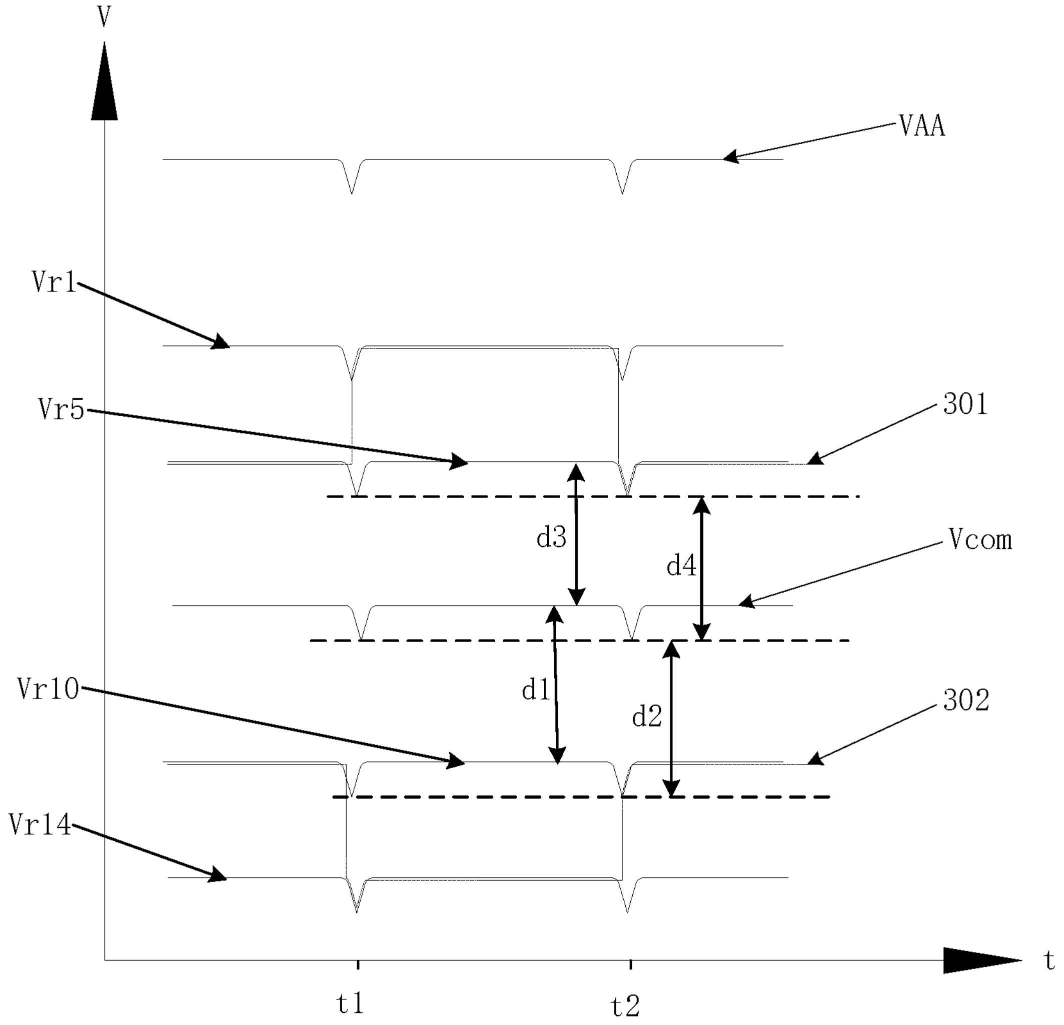
FIG. 3 is a waveform diagram of the adjacent data driver integrated circuits during the display module of FIG. 2 provided by the present application displaying the screen image shown in FIG. 4.

With reference to FIG. 3, FIG. 3 uses the voltage of the positive polarity gamma voltage terminal 501 step changing from Vr5 to Vr1 at t1, and voltage of the negative polarity gamma voltage terminal 502 step changing from Vr10 to Vr14 at t1 as an example, and uses the voltage of the positive polarity gamma voltage terminal 501 step changing from Vr1 to Vr5 at t2, and the voltage of the negative polarity gamma voltage terminal 502 step changing from Vr14 to Vr10 at t2 as an example for explanation. Other different grayscale variation is also in a protective scope of the present application.

It should be noticed that with reference to FIG. 3, the positive polarity gamma voltage signal being Vr5 and the negative polarity gamma voltage signal being Vr10 are used as an example for explanation.

When no grayscale switches, a voltage difference between Vr10, Vcom is d1. during grayscale switching, namely, during a period of step change before or after times t1, t2, the voltage difference between Vr10, Vcom is d2, as shown in FIG. 3, at the time t1, the voltage of the negative polarity data voltage terminal switches from Vr10 to Vr14. At the time t2, the voltage of the negative polarity data voltage terminal switches from Vr14 to Vr10, d1 can be equal to d2.

When no grayscale switches, a voltage difference between Vr5, Vcom is d3. During grayscale switching, namely, during a period of step change before or after times t1, t2, a voltage difference between Vr5, Vcom is d4, as shown in FIG. 3. At the time t1, a voltage of the positive polarity data voltage terminal gradually switches from Vr5 to Vr1. At the time t2, a voltage of the positive polarity data voltage terminal gradually switches from Vr1 to Vr5, and d3 can be equal to d4.

It should be noticed that the Vr5 can also be any one of Vr1 to Vr7, the Vr10 can also be any corresponding one of Vr8 to Vr14. Vr1 corresponds to Vr14, Vr2 corresponds to Vr13, . . . , and Vr7 corresponds to Vr8.

It should be noticed that the d1, d2 can be unequal, and the d3, d4 can also be unequal.

In particular, when d1 is unequal to d2, and d3 is unequal to d4, because during grayscale switching, a waveform of a signal of the positive polarity data signal terminal 301 and a waveform of a signal of the negative polarity data signal terminal 302 have a phase the same as that of a waveform of the common voltage signal Vcom such that d2 can approximate to d1 and d4 can approximate to d3. Namely, for the voltage difference d2/d4 during grayscale switching relative to voltage difference d1/d3 without grayscale switching, an amount of the voltage difference change of the positive polarity data signal terminal relative to the common voltage signal is an absolute value of (d4−d3), and an amount of the voltage difference change of the negative polarity data signal terminal relative to the common voltage signal is an absolute value of (d2−d1). Therefore, it can be known with reference to FIG. 3 that both the absolute value of (d4−d3) and the absolute value of (d2−d1) would decrease such that a change amount of the voltage difference of each of the signal of the positive polarity data signal terminal 301 and the signal of the negative polarity data signal terminal 302 relative to the common voltage signal Vcom would decrease to further tend to be constant.

In particular, when d1 is equal to d2, and d3 is equal to d4, when grayscale switches, the voltage difference d4−d3 between the signal of the positive polarity data signal terminal 301 and the common voltage signal Vcom is 0, which can keep constant, the voltage difference d2−d1 between the signal of the negative polarity data signal terminal 302 and the common voltage signal Vcom is 0, which also can keep constant.

With reference to FIG. 3, the Vcom is the common voltage signal Vcom, the VAA is a signal of the simulation voltage terminal VAA, the positive polarity data signal terminal 301 is a signal of the positive polarity data signal terminal, and the negative polarity data signal terminal 302 is a signal of the negative polarity data signal terminal.

the display module further comprises a printed circuit board, and a data driver chip 4 is disposed on the printed circuit board. The data driver chip 4 comprises a DAC module 70 and a buffer module 80. Input terminals of the DAC module are connected to fourteen gamma voltage terminals Vr1, Vr2, Vr3, . . . , Vr13, and Vr14 respectively. Output terminals of the DAC module 70 are connected to the input terminals of the buffer module 80.

Signals of the positive polarity gamma voltage terminal comprises Vr1, Vr2, . . . , Vr6, Vr7, negative polarity gamma voltage terminal comprises Vr8, Vr9 . . . , Vr13, Vr14. It should be noticed that the present application employs signals of fourteen gamma voltage terminals with positive and negative polarities as an example for explanation, it is also applied to signals of the gamma voltage terminals in other number. For example: it also can only comprise signals of four gamma voltage terminal and signals of ten gamma voltage terminals. The signals of the four gamma voltage terminals can only comprise Vr1, Vr7, Vr8, Vr14.

The first type capacitor comprises a first capacitor, . . . , a sixth capacitor, and a seventh capacitor. The signal of the simulation voltage terminal is electrically connected to Vr1 of the positive polarity gamma voltage terminal via the first capacitor. The signal of the simulation voltage terminal is electrically connected to Vr2 of the positive polarity gamma voltage terminal via the second capacitor, . . . . The signal of the simulation voltage terminal is electrically connected to Vr6 of the positive polarity gamma voltage terminal via the sixth capacitor, the signal of the simulation voltage terminal is electrically connected to Vr7 of the positive polarity gamma voltage terminal via the seventh capacitor.

The second type capacitor comprises an eighth capacitor, . . . , and a fourteenth capacitor. The signal of the simulation voltage terminal is electrically connected to Vr8 of the positive polarity gamma voltage terminal via the eighth capacitor, the signal of the simulation voltage terminal is electrically connected to Vr9 of the positive polarity gamma voltage terminal via the ninth capacitor, . . . . The signal of the simulation voltage terminal via the thirteenth capacitor is electrically connected to Vr13 of the positive polarity gamma voltage terminal. The signal of the simulation voltage terminal via the fourteenth capacitor is electrically connected to Vr14 of the positive polarity gamma voltage terminal.

It can be understood that the Vr1, . . . , Vr14 are inputted into the DAC module 70. The DAC module 70 also receives a digital signal 90, and determines, via a digital signal, signals of the gamma voltage terminal to be outputted respectively to the first buffer amplifier 201, the second buffer amplifier 202.

In the present embodiment, a voltage of the positive polarity gamma voltage terminal 501 and a voltage of the negative polarity gamma voltage terminal 502 are determined according to the grayscale, and then are processed by an amplification operator to obtain a signal of the data voltage terminal 30 to control the display module to display different grayscales.

In an embodiment, the display module further comprises a the common voltage signal Vcom, when switching between different grayscales, a signal of the simulation voltage terminal VAA generates a first waveform, and the common voltage signal Vcom generates a second waveform having a phase the same as that of the first waveform.

The signal of the simulation voltage terminal comprises a first waveform. The common voltage signal is coupled to a signal outputted by the positive polarity data voltage terminal and a signal outputted by the negative polarity data voltage terminal to have a second waveform. The first waveform and the second waveform have the same phase.

It can be understood that image display is implemented by cooperative control of the signal of the data voltage terminal 30 and the common voltage signal Vcom, and an instantaneous step change exists in the signal of the data voltage terminal 30 during grayscale switching, resulting in that the common voltage signal Vcom is coupled to generate a first waveform, i.e., a horizontal crosstalk phenomenon.

It should be noticed that because the signal of the simulation voltage terminal VAA would be influenced by the common voltage signal Vcom, the signal of the simulation voltage terminal VAA forms a first waveform the same as that of the common voltage signal Vcom.

Figure 4:
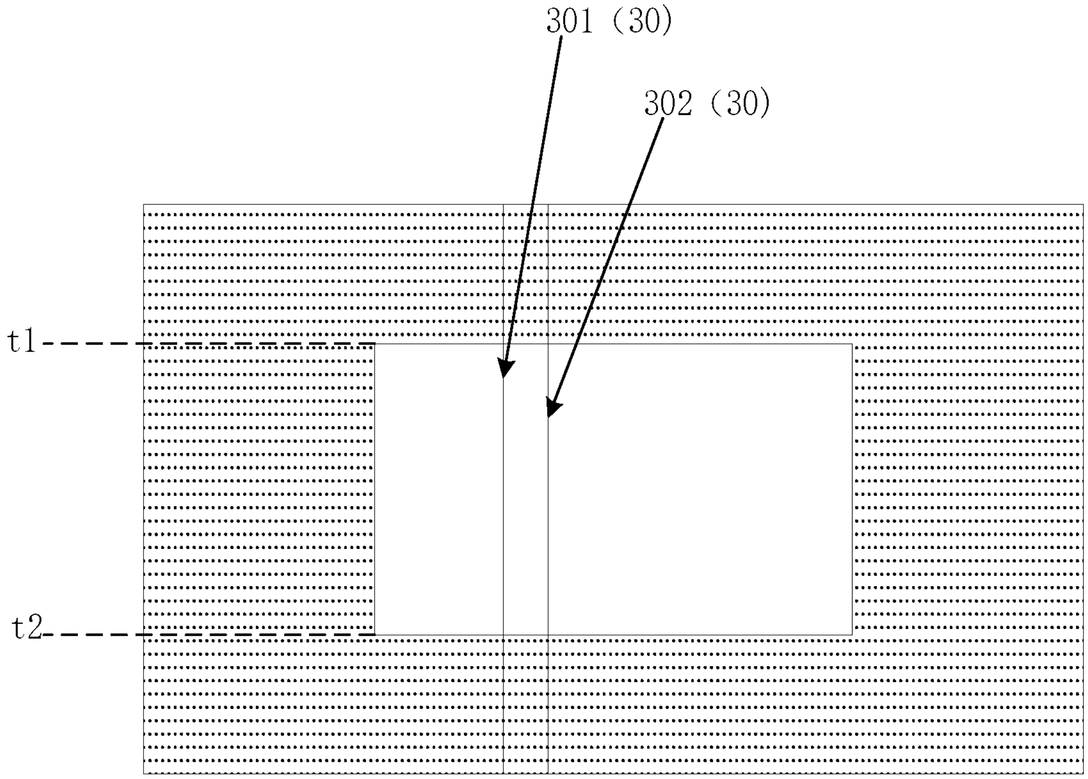
FIG. 4 is a schematic view of grayscale switching of the display module provided by the present application at times t1, t2.

It should be noticed that "when switching between different grayscales" means before or after grayscale switching, a time period in which a voltage step change waveform exists. With reference to FIG. 4, for example, grayscale switching exists at times t1, t2. Therefore, before and after the times t1, t2 of grayscale switching, the time periods, in which the voltage step change waveforms exist, belong to different grayscale switching.

In the present embodiment, both the waveform of the signal of the simulation voltage terminal VAA and the waveform of the common voltage signal Vcom are the first waveform. Coupling the waveform of the signal of the simulation voltage terminal VAA to the signal of the gamma voltage terminal 50 can make the voltage difference between each of the positive polarity data voltage signal and the negative polarity data voltage signal processed by the buffer amplifier 20 and the common voltage signal Vcom tend to be constant, which mitigates horizontal crosstalk.

In an embodiment, the first waveform, by coupling of the first type capacitor, makes a signal of the positive polarity gamma voltage terminal generate a third waveform. The first waveform by coupling of the second type capacitor makes a signal of the negative polarity gamma voltage terminal generate a fourth waveform. The third waveform and the fourth waveform comprises a phase the same as that of the first waveform phase.

A capacitor value of the first type capacitor is positively correlated with a fluctuation of the third waveform during grayscale switching, and a capacitor value of the second type capacitor is positively correlated with a fluctuation of the fourth waveform during grayscale switching.

It can be understood that uses the property that the signal of the simulation voltage terminal VAA comprises the phase the same as that of the common voltage signal Vcom such that the first waveform of the signal of the simulation voltage terminal VAA is coupled to the signal of the positive polarity gamma voltage terminal 501 and the signal of the negative polarity gamma voltage terminal 502 via a capacitor. The signal of the positive polarity gamma voltage terminal 501 obtained from coupling comprises a third waveform having a phase the same as that of the first waveform. The signal of the negative polarity gamma voltage terminal 502 obtained from coupling comprises a fourth waveform having a phase the same as that of the first waveform. Namely, as shown in the waveform diagram, the first waveform of the signal of the simulation voltage terminal VAA, the second waveform of the common voltage signal Vcom, the third waveform of the signal of the positive polarity gamma voltage terminal 501, and the fourth waveform of the signal of the negative polarity gamma voltage terminal 502 have the same phase.

Furthermore, at the times t1, t2 of grayscale change, the signal of the positive polarity data terminal obtained by processing of the first buffer amplifier comprises a fifth waveform having a phase the same as that of the third waveform. the signal of the negative polarity data terminal obtained by processing of the second buffer amplifier comprises a sixth waveform having a phase the same as that of the fourth waveform. Because the fifth waveform of the signal of the positive polarity data terminal and the sixth waveform of the signal of the negative polarity data terminal have the phase the same as that of the second waveform of the common voltage signal, a voltage difference of each of the positive polarity data voltage signal and the negative polarity data voltage signal relative to the common voltage signal tends to be constant during grayscale switching, which mitigates horizontal crosstalk.

For example, in an embodiment, the third waveform of the signal of the positive polarity gamma voltage terminal 501 is processed via the first buffer amplifier 201 to output a positive polarity grayscale voltage signal having the fifth waveform to be inputted to the positive polarity data voltage terminal 301. The fourth waveform of the signal of the negative polarity gamma voltage terminal 502 is processed via the second buffer amplifier 202 to output a negative polarity grayscale voltage signal having the sixth waveform to be inputted to the negative polarity data voltage terminal 302. The positive polarity grayscale voltage signal and the negative polarity grayscale voltage signal are in opposite polarities.

In the present embodiment, the buffer amplifier 20 is used to process a signal of the positive polarity gamma voltage terminal 501 and a signal of the negative polarity gamma voltage terminal 502 to respectively obtain a signal of the positive polarity data voltage terminal 301 and a signal of the negative polarity data voltage terminal 302 such that the signal of the positive polarity data voltage terminal 301 and the signal of the negative polarity data voltage terminal 302 are in opposite polarities, which mitigates a phenomenon of horizontal crosstalk.

In an embodiment, the first buffer amplifier 201 is electrically connected to the second buffer amplifier 202. Polarities of adjacent ones of the data driver integrated circuits 1 are opposite, and the polarities of adjacent ones of the data driver integrated circuits 1 are changed periodically.

It can be understood that the first buffer amplifier 201, the second buffer amplifier 202 are disposed alternately periodically. Signals of the gamma voltage terminal 50 received by adjacent ones of the first buffer amplifier 201 and the second buffer amplifier 202 have opposite polarities.

It can be understood that to avoid the polarization phenomenon, the first buffer amplifier 201, a polarity of the signal of the gamma voltage terminal 50 received by the second buffer amplifier 202 changes periodically. Namely, in a first time period, the first buffer amplifier 201 receives a signal of the gamma voltage terminal 50 with positive polarity, the second buffer amplifier 202 receives a signal of the gamma voltage terminal 50 with the negative polarity. In the second time period, the first buffer amplifier 201 receives a signal of the gamma voltage terminal 50 with the negative polarity, and the second buffer amplifier 202 receives a signal of the gamma voltage terminal 50 with positive polarity.

In the present embodiment, polarities of signals of the gamma voltage terminal 50 received by the first buffer amplifier 201 and the second buffer amplifier 202 are changed periodically to prevent polarization phenomenon.

Figure 5:
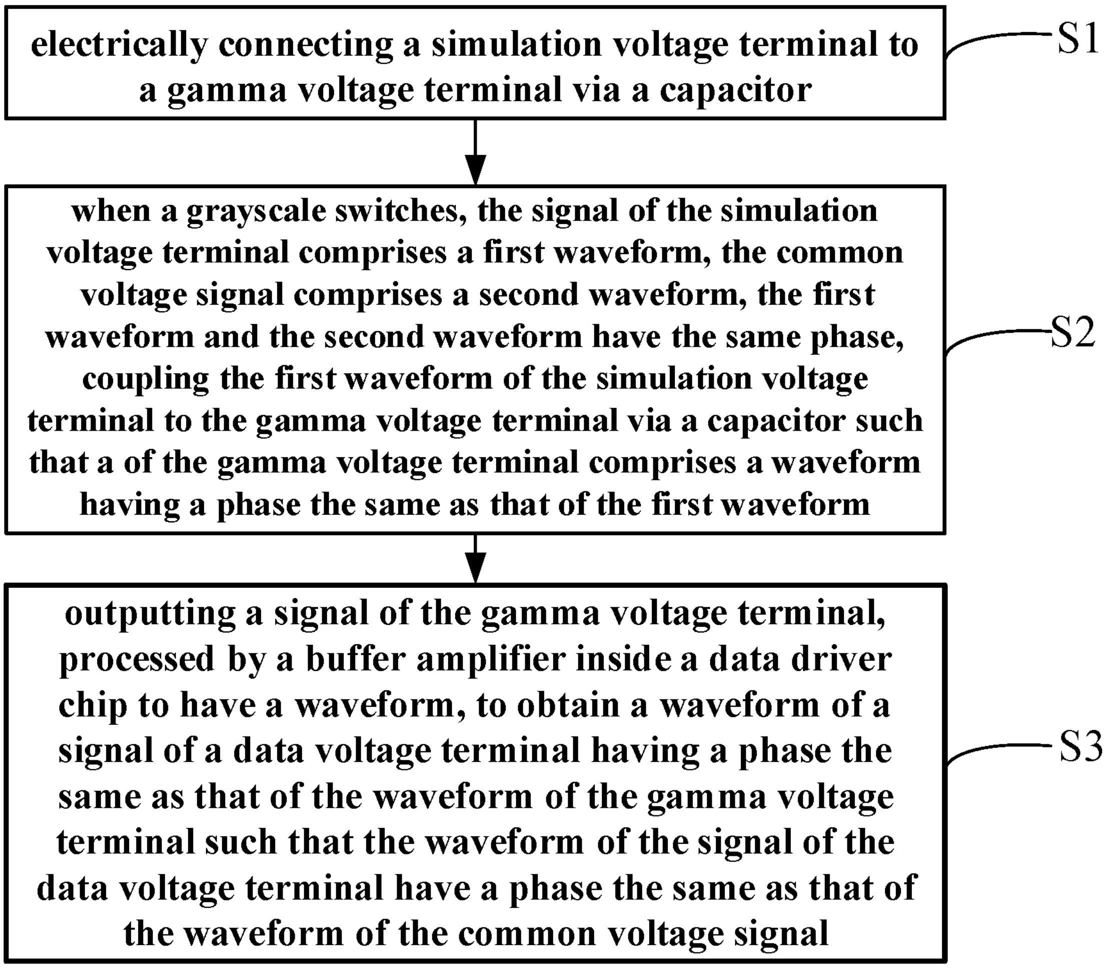
FIG. 5 is a flowchart of a gamma voltage and data voltage signal compensation method of the display module provided by the present application.

With reference to FIG. 5, the embodiment of the present application provides a data voltage signal compensation method, comprising steps as follows:

Step S1: electrically connecting a simulation voltage terminal to a gamma voltage terminal via a capacitor;

Step S2: when a grayscale switches, the signal of the simulation voltage terminal comprises a first waveform, the common voltage signal comprises a second waveform, the first waveform and the second waveform have the same phase, coupling the first waveform of the simulation voltage terminal to the gamma voltage terminal via a capacitor such that a of the gamma voltage terminal comprises a waveform having a phase the same as that of the first waveform; and Step S3: outputting a signal of the gamma voltage terminal, processed by a buffer amplifier inside a data driver chip to have a waveform, to obtain a waveform of a signal of a data voltage terminal having a phase the same as that of the waveform of the gamma voltage terminal such that the waveform of the signal of the data voltage terminal have a phase the same as that of the waveform of the common voltage signal.

In the present embodiment, at times t1, t2, because the gamma voltage terminal 50 comprises the gamma voltage terminal 50 with a positive polarity and the gamma voltage terminal 50 with a negative polarity, the obtained signal of the data voltage terminal 30 also comprises a data voltage signal of a positive polarity and a data voltage signal of a negative polarity having the same phase waveform, which mitigates horizontal crosstalk phenomenon.

The present application improves wiring connection relationship outside the data driver chip 4, the first waveform of the signal of the VAA signal terminal has a phase the same as that of the second waveform of the common voltage signal, the first waveform of the VAA signal terminal is coupled to the gamma voltage terminal 50 via the capacitor 40 such that the gamma voltage terminal has a waveform having a phase the same as that of the common voltage signal. Also, the signal of the data voltage terminal and the signal of the gamma voltage terminal have the same phase such that during grayscale switching, the fifth waveform of the signal of the positive polarity data voltage terminal and the sixth waveform of the signal of the negative polarity data voltage terminal have the phase the same as that the second waveform of the common voltage signal. Therefore, a voltage difference of each of the positive polarity data voltage signal and the negative polarity data voltage signal relative to the common voltage signal tends to be constant during grayscale switching, which mitigates horizontal crosstalk.

Furthermore, because the greater the value of the first type capacitor 401 is, the greater the fluctuation amplitude of the fifth waveform during grayscale switching is. Similarly, the greater the value of the second type capacitor 402 is, the greater the fluctuation amplitude of the sixth waveform during grayscale switching is. by adjusting the values of the first type capacitor and the second type capacitor, during grayscale switching, a voltage difference of each of the signal of the data voltage terminal with the positive polarity and the signal of the data voltage terminal with the negative polarity relative to the common voltage signal tends to be constant or is constant, which further mitigates horizontal crosstalk.

The present application also provides a display module and a terminal apparatus. Both the display module and the terminal apparatus comprises the above display module, which is not described repeatedly here. The display module further comprises at least one of a backplate, a cover lid, an optical film, and a polarizer. The terminal apparatus comprises but is not limited to cell phone, notebook, and tablet.

A display module provided by the embodiment of the present application comprises a plurality of data driver integrated circuits. Each of the data driver integrated circuits is configured to provide a data line with a data voltage signal. The data driver integrated circuit comprises a buffer amplifier, a gamma voltage terminal, a data voltage terminal, and a simulation voltage terminal. The buffer amplifier comprises an input terminal, an output terminal, and an auxiliary signal input terminal. The gamma voltage terminal is electrically connected to the input terminal. The data voltage terminal is electrically connected to the output terminal. The simulation voltage terminal is electrically connected to the auxiliary signal input terminal. The simulation voltage terminal is electrically connected to the gamma voltage terminal via a capacitor. By electrically connecting the simulation voltage terminal to the gamma voltage terminal via the capacitor, during grayscale switching, a waveform of a signal of the simulation voltage terminal, by capacitive coupling, would be coupled to a signal of the gamma voltage terminal to make the waveform of the gamma voltage signal have a phase the same as that of the common voltage signal such that a voltage difference of each of the positive polarity data voltage signal and the negative polarity data voltage signal relative to the common voltage signal tends to be constant during grayscale switching, which mitigates the horizontal crosstalk.

In the above-mentioned embodiments, the descriptions of the various embodiments are focused. For the details of the embodiments not described, reference may be made to the related descriptions of the other embodiments.

The display module provided by the embodiment of the present application are described in detail as above. In the specification, the specific examples are used to explain the principle and embodiment of the present application. The above description of the embodiments is only used to help understand the method of the present application and its spiritual idea. Meanwhile, for those skilled in the art, according to the present idea of invention, changes will be made in specific embodiment and application. In summary, the contents of this specification should not be construed as limiting the present application.

What is claimed is:

1. A display module, comprising a plurality of data driver integrated circuits configured to provide data lines with data voltage signals, wherein each of the data driver integrated circuits comprises:

a buffer amplifier comprising an input terminal, an output terminal, and an auxiliary signal input terminal;

a gamma voltage terminal electrically connected to the input terminal;

a data voltage terminal electrically connected to the output terminal; and a simulation voltage terminal electrically connected to the auxiliary signal input terminal;

wherein the simulation voltage terminal is electrically connected to the gamma voltage terminal via a capacitor;

wherein the data driver integrated circuit comprises a positive polarity data driver integrated circuit and a negative polarity data driver integrated circuit, wherein the positive polarity data driver integrated circuit comprises a first buffer amplifier, a positive polarity gamma voltage terminal, a positive polarity data voltage terminal, a simulation voltage terminal; the negative polarity data driver integrated circuit comprises a second buffer amplifier, a negative polarity gamma voltage terminal, a negative polarity data voltage terminal, and a simulation voltage terminal, the simulation voltage terminal is electrically connected to the positive polarity gamma voltage terminal via a first type capacitor, and the simulation voltage terminal is electrically connected to the negative polarity gamma voltage terminal via a second type capacitor.

2. The display module according to claim 1, wherein the display module further comprises a common voltage signal, when switching between different grayscales, a signal of the simulation voltage terminal comprises a first waveform, the common voltage signal is coupled to a signal outputted by the positive polarity data voltage terminal and a signal outputted by the negative polarity data voltage terminal to have a second waveform, and the first waveform and the second waveform comprise a same phase.

3. The display module according to claim 2, wherein the display module further comprises a common voltage signal, when switching between different grayscales, the common voltage signal generates a waveform, a voltage difference of a signal of the positive polarity data voltage terminal relative to the common voltage signal is constant, and a voltage difference of a signal of the negative polarity data voltage terminal relative to the common voltage signal is constant.

4. The display module according to claim 3, wherein the first waveform by coupling of the first type capacitor makes a signal of the positive polarity gamma voltage terminal generate a third waveform, the first waveform makes a signal of the negative polarity gamma voltage terminal generate a fourth waveform by coupling of the second type capacitor, and a phase of each of the third waveform and the fourth waveform is the same as the phase of the first waveform.

5. The display module according to claim 4, wherein a capacitor value of the first type capacitor is positively correlated with a fluctuation of the third waveform during grayscale switching, and a capacitor value of the second type capacitor is positively correlated with a fluctuation of the fourth waveform during grayscale switching.

6. The display module according to claim 1, wherein a signal of the positive polarity gamma voltage terminal comprises one of Vr1, . . . , and Vr7, and a signal of the negative polarity gamma voltage terminal comprises one of Vr8, . . . , and Vr14.

7. The display module according to claim 1, wherein the first buffer amplifier is electrically connected to the second buffer amplifier, polarities of adjacent ones of the data driver integrated circuits are opposite to each other, and the polarities of adjacent ones of the data driver integrated circuits are changed periodically.

8. The display module according to claim 1, wherein one of the first buffer amplifiers and one of the second buffer amplifiers constitute a driver unit, the driver units are electrically connected to constitute a buffer module, an end of the buffer module is electrically connected to the simulation voltage terminal, and another end of the buffer module is grounded.

9. A terminal apparatus, comprising a display module, comprising a plurality of data driver integrated circuits configured to provide data lines with data voltage signals, wherein each of the data driver integrated circuits comprises:

a buffer amplifier comprising an input terminal, an output terminal, and an auxiliary signal input terminal;

a gamma voltage terminal electrically connected to the input terminal;

a data voltage terminal electrically connected to the output terminal; and a simulation voltage terminal electrically connected to the auxiliary signal input terminal;

wherein the simulation voltage terminal is electrically connected to the gamma voltage terminal via a capacitor;

wherein the data driver integrated circuit comprises a positive polarity data driver integrated circuit and a negative polarity data driver integrated circuit, wherein the positive polarity data driver integrated circuit comprises a first buffer amplifier, a positive polarity gamma voltage terminal, a positive polarity data voltage terminal, a simulation voltage terminal; the negative polarity data driver integrated circuit comprises a second buffer amplifier, a negative polarity gamma voltage terminal, a negative polarity data voltage terminal, and a simulation voltage terminal, the simulation voltage terminal is electrically connected to the positive polarity gamma voltage terminal via a first type capacitor, and the simulation voltage terminal is electrically connected to the negative polarity gamma voltage terminal via a second type capacitor.

10. The terminal apparatus according to claim 9, wherein the display module further comprises a common voltage signal, when switching between different grayscales, a signal of the simulation voltage terminal comprises a first waveform, the common voltage signal is coupled to a signal outputted by the positive polarity data voltage terminal and a signal outputted by the negative polarity data voltage terminal to have a second waveform, and the first waveform and the second waveform comprise a same phase.

11. The terminal apparatus according to claim 10, wherein the display module further comprises a common voltage signal, when switching between different grayscales, the common voltage signal generates a waveform, a voltage difference of a signal of the positive polarity data voltage terminal relative to the common voltage signal is constant, and a voltage difference of a signal of the negative polarity data voltage terminal relative to the common voltage signal is constant.

12. The terminal apparatus according to claim 11, wherein the first waveform by coupling of the first type capacitor makes a signal of the positive polarity gamma voltage terminal generate a third waveform, the first waveform makes a signal of the negative polarity gamma voltage terminal generate a fourth waveform by coupling of the second type capacitor, and a phase of each of the third waveform and the fourth waveform is the same as the phase of the first waveform.

13. A display module, comprising a plurality of data driver integrated circuits configured to provide data lines with data voltage signals, wherein each of the data driver integrated circuits comprises:

a buffer amplifier comprising an input terminal, an output terminal, and an auxiliary signal input terminal;

a gamma voltage terminal electrically connected to the input terminal;

a data voltage terminal electrically connected to the output terminal; and a simulation voltage terminal electrically connected to the auxiliary signal input terminal;

wherein the simulation voltage terminal is electrically connected to the gamma voltage terminal via a capacitor;

wherein the data driver integrated circuit comprises a positive polarity data driver integrated circuit and a negative polarity data driver integrated circuit, wherein the positive polarity data driver integrated circuit comprises a first buffer amplifier, a positive polarity gamma voltage terminal, a positive polarity data voltage terminal, a simulation voltage terminal; the negative polarity data driver integrated circuit comprises a second buffer amplifier, a negative polarity gamma voltage terminal, a negative polarity data voltage terminal, and a simulation voltage terminal, the simulation voltage terminal is electrically connected to the positive polarity gamma voltage terminal via a first type capacitor, and the simulation voltage terminal is electrically connected to the negative polarity gamma voltage terminal via a second type capacitor;

wherein the first buffer amplifier is electrically connected to the second buffer amplifier, polarities of adjacent ones of the data driver integrated circuits are opposite to each other, and the polarities of adjacent ones of the data driver integrated circuits are changed periodically;

wherein one of the first buffer amplifiers and one of the second buffer amplifiers constitute a driver unit, the driver units are electrically connected to constitute a buffer module, an end of the buffer module is electrically connected to the simulation voltage terminal, and another end of the buffer module is grounded.

14. The display module according to claim 13, wherein the display module further comprises a common voltage signal, when switching between different grayscales, a signal of the simulation voltage terminal comprises a first waveform, the common voltage signal is coupled to a signal outputted by the positive polarity data voltage terminal and a signal outputted by the negative polarity data voltage terminal to have a second waveform, and the first waveform and the second waveform comprise a same phase.

15. The display module according to claim 14, wherein the display module further comprises a common voltage signal, when switching between different grayscales, the common voltage signal generates a waveform, a voltage difference of a signal of the positive polarity data voltage terminal relative to the common voltage signal is constant, and a voltage difference of a signal of the negative polarity data voltage terminal relative to the common voltage signal is constant.

16. The display module according to claim 15, wherein the first waveform by coupling of the first type capacitor makes a signal of the positive polarity gamma voltage terminal generate a third waveform, the first waveform makes a signal of the negative polarity gamma voltage terminal generate a fourth waveform by coupling of the second type capacitor, and a phase of each of the third waveform and the fourth waveform is the same as the phase of the first waveform.

17. The display module according to claim 16, wherein a capacitor value of the first type capacitor is positively correlated with a fluctuation of the third waveform during grayscale switching, and a capacitor value of the second type capacitor is positively correlated with a fluctuation of the fourth waveform during grayscale switching.

18. The display module according to claim 13, wherein a signal of the positive polarity gamma voltage terminal comprises one of Vr1, . . . , and Vr7, and a signal of the negative polarity gamma voltage terminal comprises one of Vr8, . . . , and Vr14.

* * * * *